United States Patent
Lo et al.

(10) Patent No.: US 9,569,015 B2
(45) Date of Patent: Feb. 14, 2017

(54) ELECTRONIC SYSTEM, TOUCH STYLUS AND DATA TRANSMISSION METHOD BETWEEN ELECTRONIC APPARATUS AND TOUCH STYLUS

(71) Applicant: HTC Corporation, Taoyuan County (TW)

(72) Inventors: Pi-Lin Lo, Taoyuan County (TW); Yi-Cheng Li, Taoyuan County (TW); Jui-Liang Chen, Taoyuan County (TW); Yi-Fan Hsueh, Taoyuan County (TW); Yen-Cheng Lin, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 186 days.

(21) Appl. No.: 14/296,467

(22) Filed: Jun. 5, 2014

(65) Prior Publication Data

US 2015/0355734 A1    Dec. 10, 2015

(51) Int. Cl.
*G06F 3/038* (2013.01)
*G06F 3/0354* (2013.01)

(52) U.S. Cl.
CPC ......... *G06F 3/03545* (2013.01); *G06F 3/0383* (2013.01); *G06F 2203/0384* (2013.01)

(58) Field of Classification Search
CPC ............... G06F 3/03545; G06F 2203/0384; G06F 3/0383
See application file for complete search history.

(56) References Cited

U.S. PATENT DOCUMENTS

| 6,563,494 B1 * | 5/2003 | Eichstaedt | G06F 3/0481 345/179 |
| 7,599,562 B2 * | 10/2009 | Liu | G06F 3/03545 340/5.2 |
| 2013/0016055 A1 * | 1/2013 | Chuang | G06F 3/03545 345/173 |
| 2013/0050101 A1 * | 2/2013 | Lu | G06F 3/0488 345/173 |
| 2014/0320434 A1 * | 10/2014 | Pantel | G06F 3/017 345/173 |

FOREIGN PATENT DOCUMENTS

TW            201310286 A     3/2013

OTHER PUBLICATIONS

Corresponding Taiwanese Office Action that this art reference was cited on Sep. 14, 2015.

* cited by examiner

*Primary Examiner* — Ariel Balaoing
(74) *Attorney, Agent, or Firm* — CKC & Partners Co., Ltd.

(57) ABSTRACT

An electronic system, a touch stylus and a data transmission method between an electronic apparatus and a touch stylus are disclosed herein. The data transmission method, utilized between a first electronic device and a touch stylus, includes steps of: generating movement data according to displacement of the touch stylus.

19 Claims, 5 Drawing Sheets

ELECTRONIC SYSTEM, TOUCH STYLUS AND DATA TRANSMISSION METHOD BETWEEN ELECTRONIC APPARATUS AND TOUCH STYLUS

BACKGROUND

Field of Invention

The present disclosure relates to a data transmission system and a method between electronic apparatuses. More particularly, the present disclosure relates to a data transmission system and a method between electronic apparatuses through a stylus.

Description of Related Art

Recently, electronic communication devices become common belongings to everyone in modern society. For example, electronic communication devices such as mobile phones, personal digital assistants, smart phones and tablet computers are widespread in various applications. The electronic communication devices are popular because the devices have various functions (such as internet surfing, multimedia message transmitting, file sharing, document editing, photo shooting and paper reading).

For example, modern smart phones usually equips large-sized touch display panel for displaying web pages, images, texts, news and all kinds of multimedia information. In addition, some smart phones equips of styluses, which are suitable for performing touch functions of selecting, dragging, handwriting, drawing, etc. The stylus is popular because it is capable to provide high preciseness for the touch-input function.

Along with the development of network communities, users prefer sharing contents of interests with their friends than reading them alone. Therefore, many information sharing method are developed, such as sharing via an email, an instant message (IM), a post on a social-network website, a text-message including a link, a QR-code, a Bluetooth/NFC transmission, etc. However, aforesaid sharing method requires the user to launch an extra application program (e.g., a program for transmitting the email, a program for sending the instant message or a browser program of accessing the social-network website), to execute extra operations (e.g., selecting the sharing target, composing the sharing contents) and also to forward the contents to be shared over a mobile communication network, such that extra costs for transmitting the file to be shared are charged to the user, and the file to be shared may occupy the network bandwidth of the smart phones.

For example, when a user finds out an interesting news report while browsing a news website and tends to share the contents with a friend beside him, the user is required to perform operations such as selecting the information to be shared, copying the information, quitting the current application, launching an instant messaging program, selecting the target to share with and pasting the information to be shared. The information to be shared is forwarded by the mobile communication network, and then his friend is able to view the news contents on the device own by his friend. The operations are complex and unfriendly.

SUMMARY

The disclosure provides an electronic system and methods. According to embodiment of the disclosure, the user is able to select an object to be shared on the touch display panel of a former electronic apparatus by a stylus, and perform a specific gesture (e.g., lifting the stylus up and away from the former electronic apparatus), such that related data of the object to be shared are transmitted wirelessly to the stylus and temporarily stored in the stylus. Afterward, the user is able to utilize the stylus to perform a specific gesture (e.g., moving the stylus toward a touch display panel of another electronic apparatus), and the stylus is configured to transmit the related data of the object temporarily stored in the stylus to the later electronic apparatus. Therefore, contents of interests can be shared between two electronic apparatuses through the stylus intuitively, without launching other communication programs or transmitting over 3G/4G mobile network.

An aspect of the disclosure is to provide an electronic system, which includes a stylus and a first electronic apparatus. The stylus includes a first sensor. The first sensor generates first movement data according to displacement of the stylus. The first electronic apparatus is wirelessly connected with the stylus. The first electronic apparatus transmits or receives first data according to the first movement data.

According to an embodiment of the disclosure, the stylus further includes a first storage unit, a first wireless module and a first processing unit. The first wireless module is configured to transmit or receive the first data. The first processing unit is coupled with the first storage unit, the first sensor and the first wireless module. The first electronic apparatus further includes a second storage unit, a touch display panel, a second wireless module and a second processing unit. The second storage unit is configured for storing the first data. The touch display panel is configured for displaying a first display image. The second wireless module is configured for transmitting or receiving the first data. The second processing unit is coupled with the second wireless module, the touch display panel and the second storage unit. The second processing unit transmits the first data to the stylus according to the first movement data.

According to an embodiment of the disclosure, when the second processing unit determines that a moving pattern of the stylus matches a first setting range according to the first movement data, the second processing unit transmits the first data through the second wireless module, and the first processing unit receives the first data through the first wireless module and stores the first data in the first storage unit.

According to an embodiment of the disclosure, the stylus further includes a second sensor coupled with the first processing unit. The second sensor generates a signal when the second sensor senses a touch on the stylus, and the first processing unit detects the displacement of the stylus by the first sensor when the first processing unit receives the signal.

According to an embodiment of the disclosure, the electronic system further includes a third wireless module coupled with the first processing unit. The third wireless module is configured to wirelessly transmit the first movement data.

According to an embodiment of the disclosure, the first storage unit is configured for storing second data. When the second processing unit determines that the displacement of the stylus matches a second setting range according to the first movement data, the first processing unit transmits the second data through the first wireless module, and also the second processing unit receives the second data through the second wireless module and stores the second data in the second storage unit.

According to an embodiment of the disclosure, the first storage unit is configured for storing second data. When the first processing unit determines that a moving pattern of the stylus matches a second setting range according to the first movement data, the first processing unit transmits the second data through the first wireless module, and the second processing unit receives the second data through the second wireless module and stores the second data in the second storage unit.

According to an embodiment of the disclosure, the first display image includes information from at least part of the first data. When the stylus manipulates the touch display panel to display the information from the first data, the first sensor generates the first movement data according to the displacement of the stylus.

According to an embodiment of the disclosure, the second storage unit is configured to store first identification data. The first processing unit transmits second identification data through the first wireless module to the first electronic apparatus. When the second processing unit determines that the second identification data matches the first identification data, the first electronic apparatus transmits the first data to the stylus.

According to an embodiment of the disclosure, the first electronic apparatus further includes a third sensor. The third sensor generates second movement data according to displacement of the first electronic apparatus. The first electronic apparatus transmits or receives the first data according to the first movement data and the second movement data.

Another aspect of the disclosure is to provide a stylus, which is configured for manipulating an electronic apparatus. The stylus includes a first processing unit, a storage unit, a first sensor and a first wireless module. The storage unit is coupled with the first processing unit. The storage unit is configured for storeing data. The first sensor is coupled with the first processing unit. The first sensor generates movement data according to displacement of the stylus. The first wireless module is coupled with the first processing unit. The first wireless module is configured for transmitting the data. When the first processing unit determines that the movement data matches a first setting range, the first wireless module transmits the data to the electronic apparatus.

According to an embodiment of the disclosure, the stylus further includes a second sensor coupled with the first processing unit. When the second sensor senses a touch on the stylus, the first processing unit detects displacement of the stylus by the first sensor.

Another aspect of the disclosure is to provide a method, which is utilized between a first electronic apparatus and a stylus. The method includes steps of: generating a first movement data according to displacement of the stylus; determining a moving pattern of the stylus according to the first movement data; and, transmitting first data from the first electronic apparatus to the stylus when the first movement data matches a first setting range.

According to an embodiment of the disclosure, the method further includes steps of: determining whether the moving pattern matches a second setting range according to the first movement data; and, transmitting second data from the stylus to the first electronic apparatus when the first movement data matches the second setting range.

According to an embodiment of the disclosure, the method further includes steps of: sensing a touch on the stylus; and, generating the first movement data according to the displacement of the stylus when the touch is sensed.

Another aspect of the disclosure is to provide a method, which is utilized between a first electronic apparatus with a touch display panel and a stylus. The method includes steps of: generating first movement data according to displacement of the stylus; generating second movement data according to displacement of the first electronic apparatus; determining a moving pattern of the stylus according to the first movement data and the second movement data; and, transmitting first data from the first electronic apparatus to the stylus when the moving pattern of the stylus matches a first setting range.

According to an embodiment of the disclosure, the method further includes steps of: determining whether the moving pattern matches a second setting range according to the first movement data and the second movement data; and, transmitting second data from the stylus to the first electronic apparatus when the first movement data matches the second setting range.

According to an embodiment of the disclosure, the method further includes steps of: sensing a touch on the stylus; and, generating the first movement data according to the displacement of the stylus when the touch is sensed.

According to an embodiment of the disclosure, the method further includes steps of displaying information from at least part of the first data on the touch display panel; and, when the stylus manipulates the touch display panel to display the information from the first data, generating the first movement data by the stylus according to the displacement of the stylus.

According to an embodiment of the disclosure, the method further includes steps of: storing first identification data within the first electronic apparatus; transmitting second identification data by the stylus to the first electronic apparatus; and, activating a data transmission between the first electronic apparatus and the stylus when the second identification data is determined to match the first identification data.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
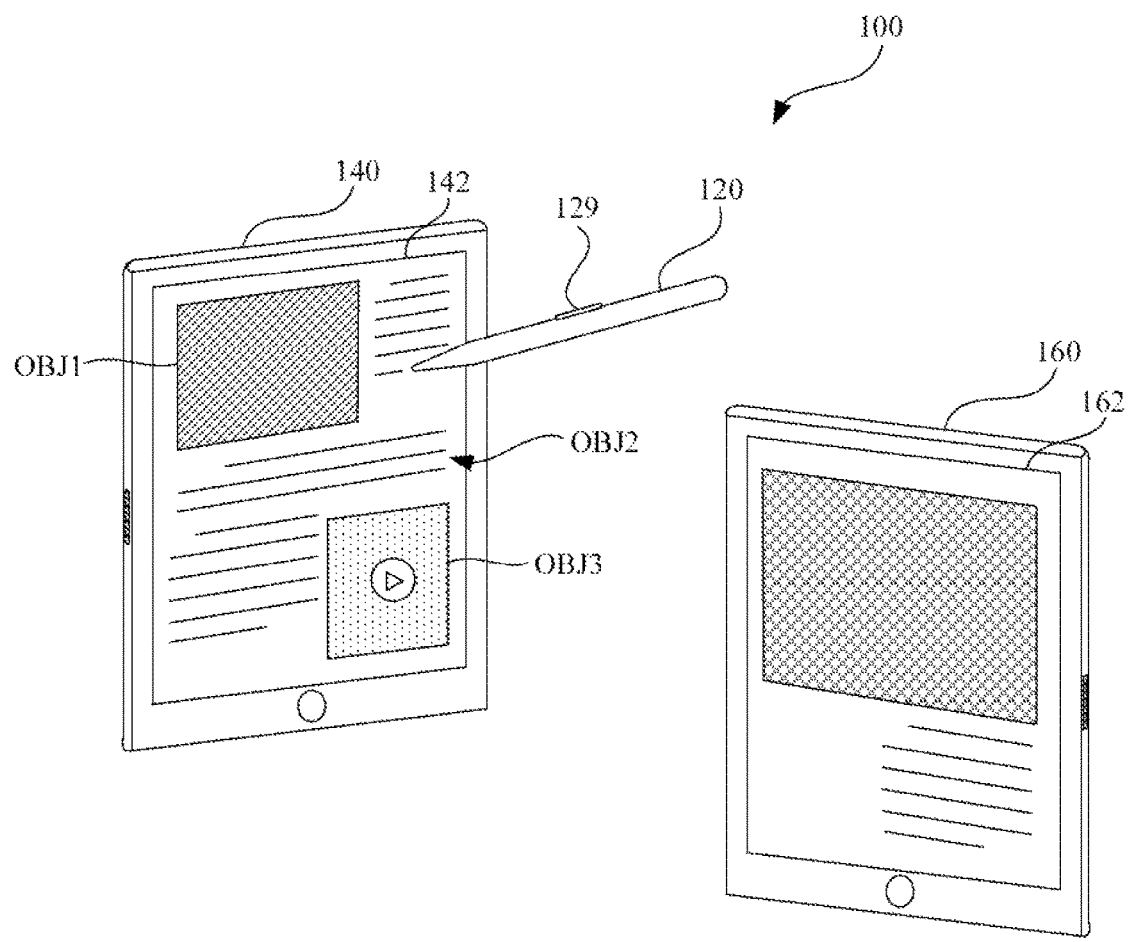
FIG. 1 is a schematic diagram illustrating an electronic system according to an embodiment of the disclosure.

Reference will now be made in detail to the present embodiments of the disclosure, examples of which are illustrated in the accompanying drawings. Wherever possible, the same reference numbers are used in the drawings and the description to refer to the same or like parts.

Reference is made to FIG. 1, which is a schematic diagram illustrating an electronic system 100 according to an embodiment of the disclosure. As shown in the figure, the electronic system 100 includes a stylus 120, an electronic apparatus 140 and another electronic apparatus 160. The stylus 120 of the electronic system 100 in the embodiment is utilized as an intermediary medium for transmitting/sharing/interchanging information between the electronic apparatus 140 and the electronic apparatus 160. In the following embodiment, the electronic apparatus 140 is an information transmitter/broadcaster end and the electronic apparatus 160 is an information receiver end for demonstration, but the disclosure is not limited thereto. In practical applications, the electronic apparatus 140 and the electronic apparatus 160 may perform the transmission in a reversed direction, or the transmission/interchanging in two directions, which can be acknowledged from following embodiments.

Figure 2:
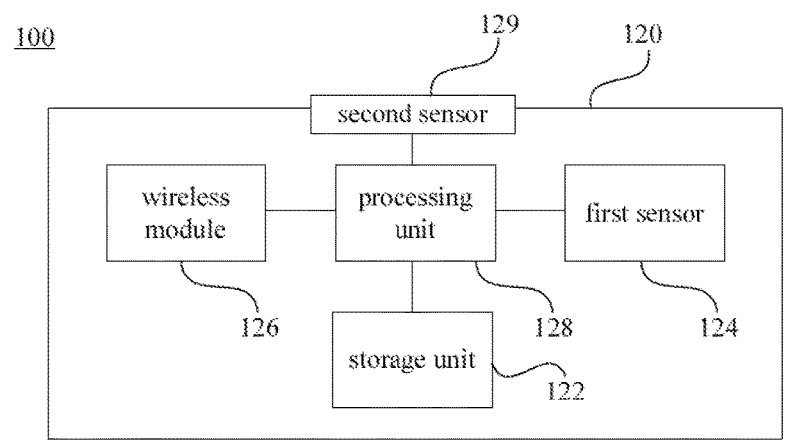
FIG. 2 is a functional block diagram illustrating the stylus, the electronic apparatus and the electronic apparatus of the electronic system.
Figure 2:
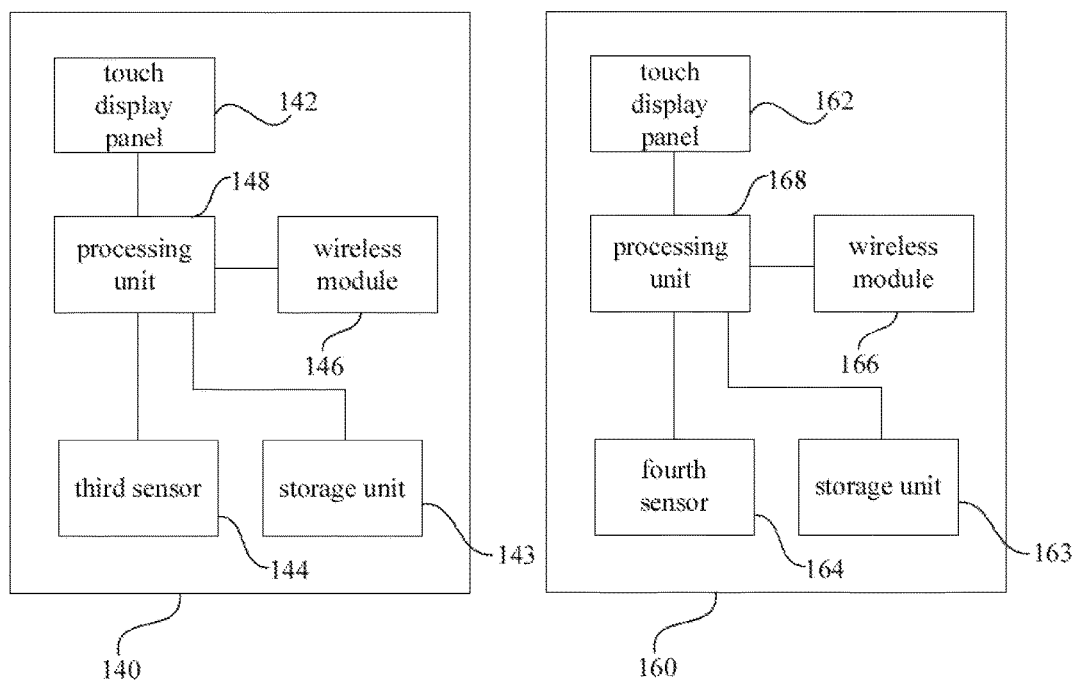

Reference is also made to FIG. 2, which is a functional block diagram illustrating the stylus 120, the electronic apparatus 140 and the electronic apparatus 160 of the electronic system 100. As shown in FIG. 1 and FIG. 2, the stylus 120 includes a storage unit 122, a first sensor 124, a wireless module 126, a second sensor 129 and a processing unit 128 coupled to aforesaid components (the storage unit 122, the first sensor 124, the wireless module 126 and the second sensor 129). In some embodiments, the second sensor is a switch unit, a confirmation button, a confirmation switch by sensing a touch or any equivalent switch sensor.

The electronic apparatus 140 (i.e., the information transmitter/broadcaster end in the embodiment) includes a touch display panel 142, a storage unit 143, a third sensor 144, a wireless module 146 and a processing unit 148 coupled to aforesaid components (the touch display panel 142, the third sensor 144 and the wireless module 146). The storage unit 143 is configured to store data on the electronic apparatus 140.

On the other hand, the electronic apparatus 160 (i.e., the information receiver end in the embodiment) includes a touch display panel 162, a storage unit 163, a fourth sensor 164, a wireless module 166 and a processing unit 168 coupled to aforesaid components (the touch display panel 162, the fourth sensor 164 and the wireless module 166). The storage unit 163 is configured to store data on the electronic apparatus 160.

As shown in FIG. 1, the touch display panel 142 of the electronic apparatus 140 is configured for displaying a first display image. The first display image includes a plurality of objects. For example, there are an image object OBJ1, a text-content object OBJ2 and a video object OBJ3 displayed on the touch display panel 142 in the embodiment shown in FIG. 1, but the disclosure is not limited thereto.

In the embodiment, the stylus 120 is paired with the electronic apparatus 140 and operated to perform a touch input function on the electronic apparatus 140, so as to elevate the preciseness of the touch input function on the touch display panel 142. The stylus 120 can be utilized to perform all kinds operations (clicking on the objects, playing a video, scrolling up/down a window of the display image, etc) on the touch display panel 142.

The wireless module 146 of the electronic apparatus 140 is configured to perform a wireless communication with the wireless module 126 of the stylus 120. On the other hand, the wireless module 166 of the electronic apparatus 160 is also configured to perform a wireless communication with the wireless module 126 of the stylus 120. The wireless modules 126, 146, 166 of the stylus 120, the electronic apparatus 140 and the electronic apparatus 160 may include Wireless Fidelity (WiFi) communication circuits, Bluetooth communication circuits, Zigbee communication circuits, Near-Field Communication (NFC) circuits, Adhoc communication circuits or any equivalent local peer-to-peer communication circuits, which are utilized to realize the communication between the stylus 120 and the electronic apparatus 140/160.

The first sensor 124, the third sensor 144 and the fourth sensor 164 of the stylus, the electronic apparatus 140 and the electronic apparatus 160 are motion sensors respectively configured to detect information including orientation, acceleration and/or gravity axial. For example, each of the first sensor 124, the third sensor 144 and the fourth sensor 164 includes at least one of a gravity sensor (G-sensor), a gyro meter and an electronic compass (E-compass). In some embodiments, each of the first sensor 124, the third sensor 144 and the fourth sensor 164 includes a combination of at least two from the gravity sensor, the gyro meter and the electronic compass respectively.

For example, the first sensor 124 is configured to sense first movement data corresponding to the location of the stylus 120. The third sensor 144 is configured to sense second movement data corresponding to the location of the electronic apparatus 140. The fourth sensor 164 is configured to sense third movement data corresponding to the location of the electronic apparatus 160.

The first sensor 124 is able to obtain a direction of acceleration, the gravity axial or location coordinates of the stylus 120 as the first movement data. Then, the stylus 120 sends the first movement data to the processing unit 148, such that the processing unit 148 may acknowledge a current movement state of the stylus 120.

In some embodiments, the processing unit 148 of the electronic apparatus 140 is able of receiving second movement data from the third sensor 144 of the electronic apparatus 140, and also receiving the first movement data of the stylus 120 via the wireless communication. In this case, the processing unit 148 determines a relative location relationship (e.g., approaching to each other, maintaining the same distance, moving away from each other) between the electronic apparatus 140 and the stylus 120 according to both of the first movement data and the second movement data.

Figure 3:
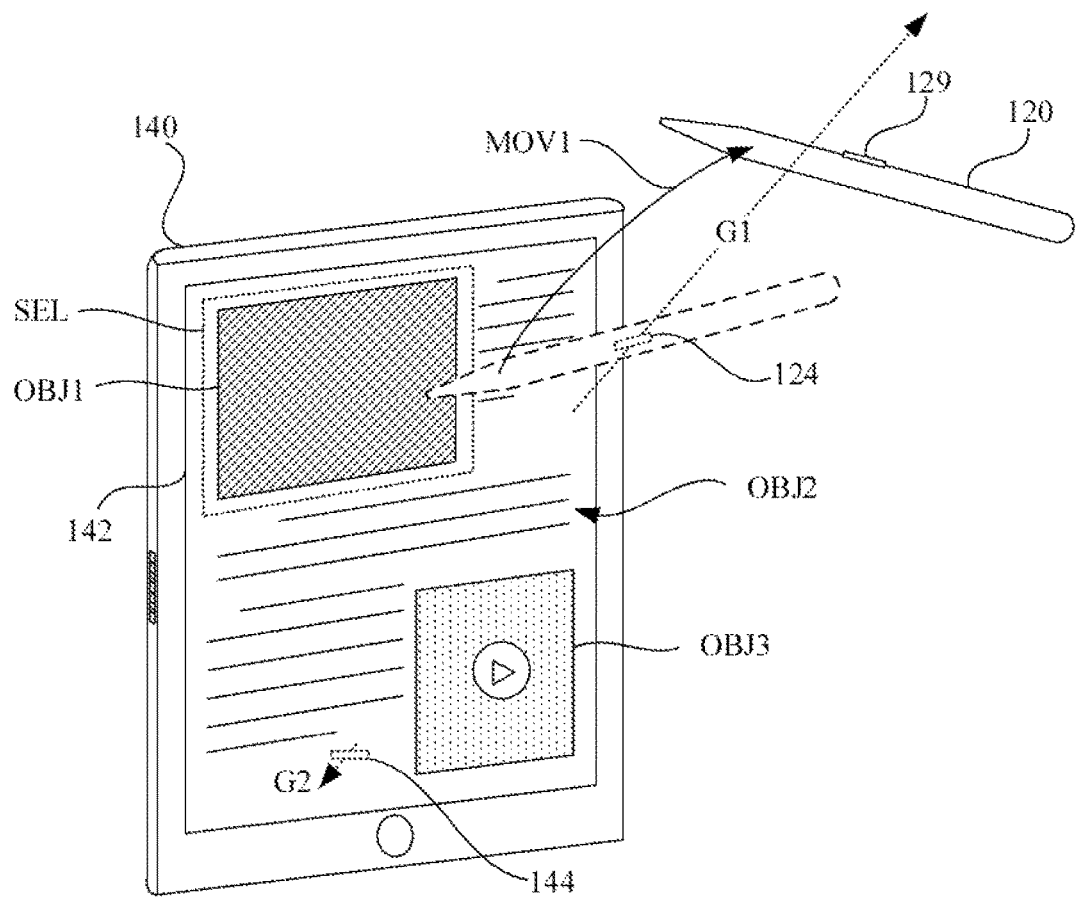
FIG. 3 is a schematic diagram illustrating an operational example that a user selecting an object to be shared on the electronic apparatus and the object is transmitted to the stylus.

Afterward, reference is also made to FIG. 3, which is a schematic diagram illustrating an operational example that a user selecting an object to be shared on the electronic apparatus 140 and the object is transmitted to the stylus 120. As shown in FIG. 3, the operational example shows a situation that the user tends to share the image object OBJ1 shown on the touch display panel 142 of the electronic apparatus 140 to another apparatus. At first, the user manipulates the stylus 120 to click (or circle) a specific region SEL on the touch display panel 142, so as to select at least one object from the first display image. As shown in FIG. 3, the region SEL covers the image object OBJ1, but the disclosure is not limited to this (in other embodiments, the region SEL may cover more objects or all contents in the first display image shown on the touch display panel 142). In another embodiment, the specific region may be assigned by a circling gesture for selecting at least one object.

Afterward, the processing unit 148 determines whether a difference between the first movement data (representing the stylus 120) and the second movement data (representing the electronic apparatus 140) matches a first setting range. In the example of FIG. 3, the user move the stylus 120 along a moving pattern MOV1, such that the difference between the first movement data and the second movement data is enlarged gradually to a certain degree. In other words, the first setting range means that the stylus 120 is moved away from the electronic apparatus 140 rapidly (or with certain acceleration).

In a practical operation example, each of the first sensor 124 and the third sensor 144 includes a g-sensor. The first sensor 124 is able to detect acceleration on the stylus 120 (e.g., the acceleration G1 shown in FIG. 3). The acceleration G1 has three different vectors along three orthogonal directions, such as acceleration data [a1, a2, a3]. The third sensor 144 is able to detect acceleration on the electronic apparatus 140 (e.g., the acceleration G2 shown in FIG. 3). The acceleration G2 has three different vectors along three orthogonal directions, such as acceleration data [b1, b2, b3]. When the user selects an object to be shared on the electronic apparatus 140 (i.e., the stylus 120 contacts on the electronic apparatus 140, such that the electronic apparatus 140 detects the stylus 120 and the distance in-between is narrowed), the first sensor 124 detects the acceleration data [a1, a2, a3] of the stylus 120, and the third sensor 144 detects the acceleration data [b1, b2, b3] of the electronic apparatus 140. Relative displacement between the stylus 120 and the electronic apparatus 140 may be obtained from the difference of acceleration data [a1-b1, a2-b2, a3-b3] or vector analysis. In the embodiment shown in FIG. 3, when the first sensor detects the outward acceleration G1 [3, 8, 0] and the third sensor 144 detects the acceleration G2 [0, 0.01, 0] (which is extremely small or approximately zero), it indicates that the stylus 120 and the electronic apparatus 140 are moved away [3-0, 8-0.01, 0-0], and the relative difference of acceleration is [3, 7.99, 0].

Aforesaid moving away condition in the disclosure is not limited to that the first sensor 124 and the third sensor 144 detects the accelerations G1 and G2 in opposite directions. When the first sensor 124 detects the acceleration G1 and the third sensor 144 detects no acceleration, the stylus 120 and the electronic apparatus 140 are determined to be moved away. In other words, a vector difference (including the direction and the magnitude) between the accelerations G1 and G2 is utilized in the determination.

In a practical operation example, each of the first sensor 124 and the third sensor 144 includes an electronic compass. The first sensor 124 is able to detect a first movement data corresponding to the location of the stylus 120, such as coordinates data [x1, y1, z1] (not shown in figures). The third sensor 144 is able to detect a second movement data corresponding to the location of the electronic apparatus 140, such as coordinates data [x2, y2, z2] (not shown in figures). The fourth sensor 144 is able to detect third movement data corresponding to the location of the electronic apparatus 160, such as coordinates data [x3, y3, z3] (not shown in figures). In practical operational examples, the relative location relationship between the electronic apparatus 140 and the stylus 120 can be obtained according to the coordinates data [x1, y1, z1] and [x2, y2, z2] and so forth.

If the processing unit 148 determines that the difference between the first movement data and the second movement data matches the first setting range (i.e., the stylus 120 is moved away from the electronic apparatus 140), object information of the selected object is wirelessly transmitted from the electronic apparatus 140 to the stylus 120 and temporarily stored within the storage unit 122 of the stylus 120.

In the embodiment, the object information includes at least one from original contents of the selected object (e.g., texts, images, videos, etc), a processed result (compressed files, encrypted files, etc) of the original selected object, or a substitute (a hyperlink to the original object, a barcode or a QR code, etc) of the selected object. It depends on the size of the original contents of the selected object, the speed of the wireless transmission or the user's decision.

In other words, when the user manipulates the stylus 120 to select the object to be shared on the touch display panel 142, the object to be shared will be automatically transmitted to the storage unit 122 of the stylus 120 once the stylus 120 is rapidly lifted from the touch display panel 142. The lifting gesture is intuitive.

Within a certain time period, the object information will be temporarily stored within the storage unit 122 of the stylus until that the object information is transmitted to another electronic apparatus 160, the object information is invalid of timeliness, or the user choose to discard the object information which is temporarily stored.

Figure 4:
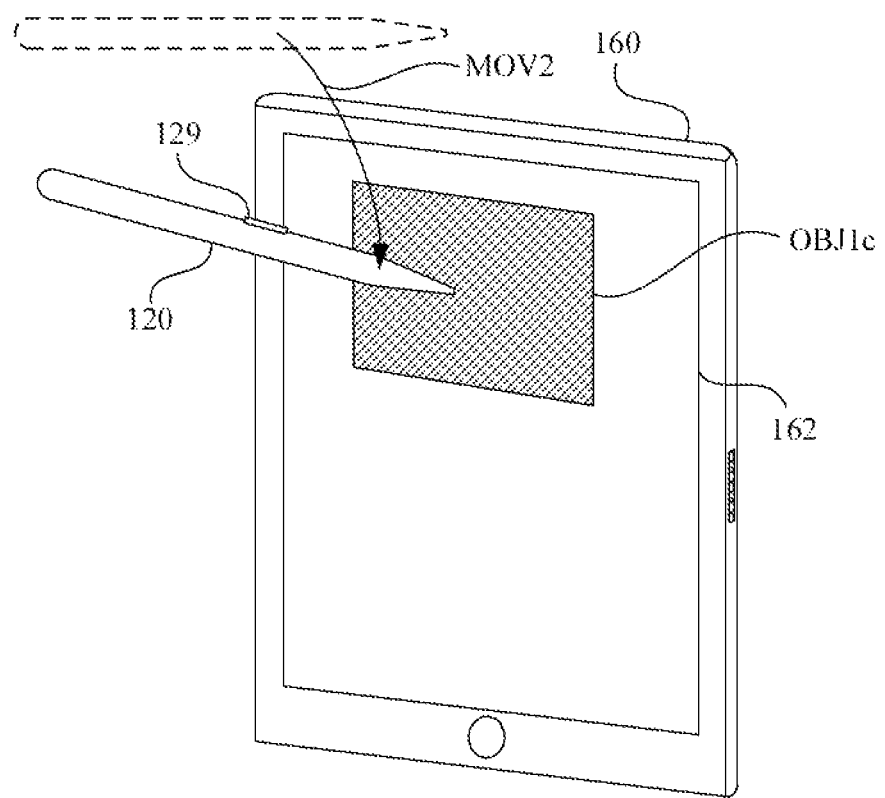
FIG. 4 is a schematic diagram illustrating an operational example that a user transmitting the object information temporarily stored in the stylus to the electronic apparatus.

Afterward, reference is also made to FIG. 4, which is a schematic diagram illustrating an operational example that a user transmitting the object information temporarily stored in the stylus 120 to the electronic apparatus 160.

As shown in FIG. 1 and FIG. 2, the touch display panel 162 of the electronic apparatus 160 is configured for displaying a second display image. The processing unit 168 of the electronic apparatus 160 is able to receiving third movement data from the fourth sensor 164 of the electronic apparatus 160, and also receiving the first movement data of the stylus 120 via the wireless communication.

In this case, the processing unit 148 determines whether a difference between the first movement data and the third movement data matches a second setting range. In the example of FIG. 4, the user move the stylus 120 along a moving pattern MOV2, such that the difference between the first movement data and the third movement data is reduced gradually to a certain degree. In other word the first setting range means that the stylus 120 is moved to approach the electronic apparatus 160 rapidly (or with certain acceleration) within a specific time period. In some other embodiments, the processing unit 168 of the electronic apparatus 160 determines whether the stylus 120 contacts the touch display panel 162.

If the processing unit 168 determines that the difference between the first movement data and the third movement data matches the second setting range (or the stylus 120 has contacted the touch display panel 162), the object information stored in the storage unit 122 is wirelessly transmitted from the stylus 120 to the electronic apparatus 160 (in other embodiments of practical application, the electronic apparatus 160 wirelessly fetches the object information stored in the storage unit 122 of stylus 120). Afterward, the object information (as the image object OBJ1c shown in FIG. 4) is displayed on the second display image corresponding to the location of the stylus 120 relative to the touch display panel 162.

In other words, the object to be shared will be automatically transmitted to the electronic apparatus 160 and displayed on the touch display panel 162 once the stylus 120 is rapidly moved by the user to approach and contact on the touch display panel 162. The approaching gesture is intuitive.

Based on aforesaid embodiments, when the user tends to share specific objects to other apparatus around, the user may select the object by the stylus 120, perform a lifting gesture (e.g., the moving pattern MOV1 as shown in FIG. 3) and perform placing gesture (e.g., the moving pattern MOV2 as shown in FIG. 4), such that the selected objected is duplicated to the other apparatus (e.g., showing on a display panel of the other apparatus).

In aforesaid embodiments, the object transmission is determined to be activated (according the first setting range is matched or not) when the stylus and the electronic apparatus is relatively moved away. However, the user may simply lift the stylus 120 up a while, and then return the stylus 120 to the electronic apparatus 140 for other manipulations. If there is no confirmation function to check whether the user want to launch the information sharing process, there is high possibility to have a misjudgment, and the computing resource will be wasted (for unnecessary computation) in this case.

Therefore, a confirmation process is disclosed in following paragraphs. In the embodiment, the stylus 120 further includes a second sensor 129. The second sensor 129 is a switch unit, a confirmation button, a confirmation switch by sensing a touch or any equivalent switch sensor. For example, the second sensor 129 is a confirmation button disposed on the surface of the stylus 120.

The confirmation process in the embodiment is that the object information of the selected object is wirelessly transmitted to the stylus 120 only when the second sensor 129 is activated (e.g., the confirmation button is pressed down) and also the difference between the first movement data and the second movement data matches the first setting range. If the second sensor 129 is not activated, aforesaid sharing procedure will not be triggered/executed, and the manipulation of the stylus 120 to the touch display panel 142 is viewed as a regular touch input by the electronic apparatus 140 in this case.

In the embodiment, during the period that the second sensor 129 is activated (e.g.: the confirmation button is pressed down), the object information is consistently stored in the storage unit 122 of the stylus, until the difference between the first movement data and the third movement data matches the second setting range (the stylus 120 is moved adjacent to the electronic 160) and the second sensor 129 is deactivated (e.g., the confirmation button is released). When the difference between the first movement data and the third movement data matches the second setting range (the stylus 120 is moved adjacent to the electronic 160) and the second sensor 129 is deactivated (e.g., the confirmation button is released), the object information of the selected object is wirelessly transmitted from the stylus 120 to the electronic apparatus 160.

In some embodiments, if the second sensor 129 is deactivated (e.g., the confirmation button is released) and the stylus 120 is not move to approach any other electronic apparatus, the object information within the storage unit 122 is cleared, so as to prevent that the storage unit 122 of the stylus 120 is occupied by useless data.

Furthermore, another confirmation process is disclosed in following paragraphs. In the embodiment of confirmation process, the stylus 120 is configured to be paired with the electronic apparatus 140 (i.e., the transmitter/broadcaster end), such that the storage unit 122 of the stylus 120 further stores identification information data paired with the electronic apparatus 140. When the user contacts another electronic apparatus 160 with the stylus 120, the electronic apparatus 160 can acknowledge that the stylus 120 is an exotic (unfamiliar) touch input device. In this case, the electronic apparatus 160 is activated to read the storage unit 122, and determine that whether the storage unit 122 of the stylus 120 carries any object information to be shared.

On the other hand, if the original electronic apparatus 140 senses the touch event from the stylus 120, the electronic apparatus 140 can acknowledge that the stylus is the current-paired touch input device. In the case, the electronic apparatus 140 is not required to read the storage unit 122 of the stylus 120.

Based on aforesaid confirmation processes, the misjudgment for triggering the sharing procedure may be avoid, and it saves the computing resource from performing unnecessary computations.

Figure 5:
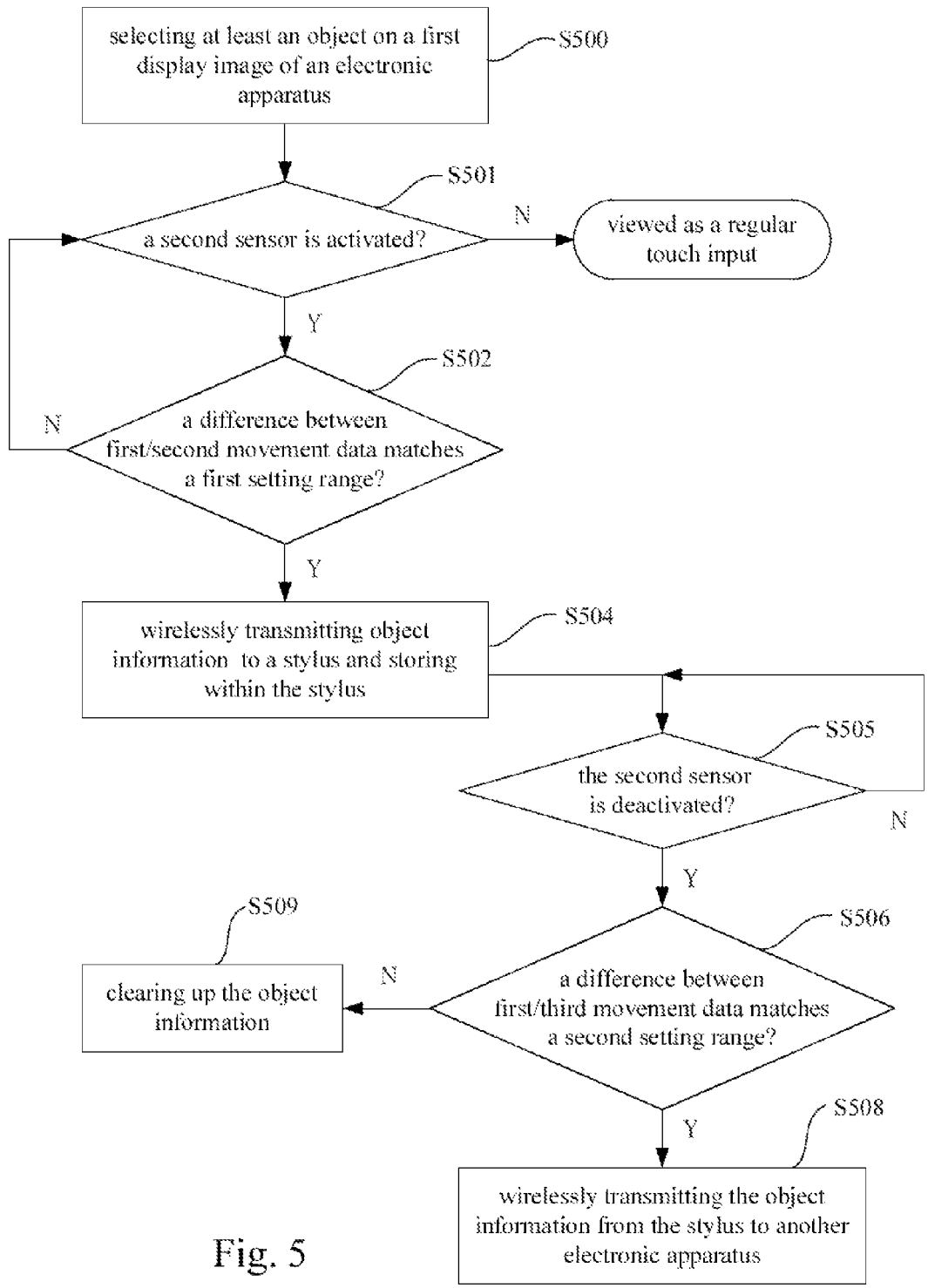
FIG. 5 is a flow-chart diagram illustrating an information sharing method according to an embodiment of the disclosure.

Reference is also made to FIG. 5, which is a flow-chart diagram illustrating an information sharing method according to an embodiment of the disclosure. The information sharing method is suitable to be utilized between two electronic apparatuses (such as the electronic apparatus 140 and the electronic apparatus 160 in aforesaid embodiment) and a stylus (such as the stylus 120 in aforesaid embodiments) is involved in performing the information sharing between two electronic apparatuses.

At first, step S500 is executed for selecting at least an object (e.g., the object OBJ1, OBJ2 or OBJ3 in FIG. 1) on the first display image of the electronic apparatus 140.

Afterward, step S502 is executed for determining whether a difference between first movement data of the stylus 120 and second movement data of the electronic apparatus 140 matches a first setting range (i.e., the difference between the first movement data and the second movement data is enlarged gradually).

If the first setting range is matched, step S504 is executed for wirelessly transmitting object information of the selected object from the electronic apparatus 140 to the stylus 120, and storing within the storage unit 122 of the stylus 120. In addition, the stylus 120 further includes a second sensor (switch unit) 129 disposed on the surface of the stylus 120. Before step S502, the information sharing method further executes step S501 for determining whether the second sensor (switch unit) 129 is activated. Only when the second sensor (switch unit) 129 is activated and the first setting range is matched, step S504 is executed. If the second sensor (switch unit) 129 is determined to be not activated, the manipulation of the stylus 120 is viewed as a regular touch input by the electronic apparatus 140.

Afterward, step S505 is executed for determining whether the second sensor (switch unit) 129 is deactivated. If the second sensor (switch unit) 129 is deactivated, steps S506 is executed for determining whether a difference between first movement data of the stylus 120 and third movement data of the electronic apparatus 160 matches a second setting range (i.e., the difference between the first movement data and the third movement data is reduced gradually).

If the second setting range is matched, step S508 is executed for wirelessly transmitting the object information stored in the storage unit 122 from the stylus 120 to the electronic apparatus 160. If the second setting range is not matched, step S509 is executed for clearing up the object information stored in the storage unit 122.

In addition, during the time period that the second sensor (switch unit) 129 is activated, the object information is consistently stored in the storage unit 122 of the stylus, until the difference between the first movement data and the third movement data matches the second setting range and the second sensor (switch unit) 129 is deactivated (e.g., the confirmation button is released). When the second setting range is matched and the second sensor (switch unit) 129 is deactivated, the object information is wirelessly transmitted from the stylus 120 to the electronic apparatus 160.

The details, confirmation processes and theories of the information sharing method are already explained in embodiments of FIG. 1 to FIG. 4, and not repeated here.

According to embodiment of the disclosure, the user can select an object to be shared on the touch display panel of a former electronic apparatus by a stylus, and perform a specific gesture (e.g., lifting the stylus up and away from the former electronic apparatus), such that the related data of the object to be shared are transmitted wirelessly to the stylus and temporarily stored in the stylus. Afterward, the user can utilize the stylus to perform a specific gesture (e.g., moving the stylus toward a touch display panel of another electronic apparatus), the stylus can transmit the related data of the object temporarily stored in the stylus to the later electronic apparatus. Therefore, contents of interests can be shared between two electronic apparatuses through the stylus intuitively, without launching other communication programs or transmitting over 3G/4G mobile network.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An electronic system, comprising:
   a stylus comprising:
      a first sensor, the first sensor generating a first movement data according to displacement of the stylus;
      a first storage unit;
      a first wireless module, configured to transmit or receive a first data; and
      a first processing unit, coupled with the first storage unit, the first sensor and the first wireless module;
   a first electronic apparatus wirelessly connected with the stylus, the first electronic apparatus transmitting or receiving the first data according to the first movement data;
   wherein the first electronic apparatus further comprises:
      a second wireless module, configured for transmitting or receiving the first data; and
      a second processing unit, configured for transmitting the first data to the stylus according to the first movement data;
   wherein, when the second processing unit determines that a moving pattern of the stylus matches a first setting range according to the first movement data, the second processing unit transmits the first data through the second wireless module, the first processing unit receives the first data through the first wireless module and stores the first data in the first storage unit;
   wherein the first setting range corresponds to a predefined acceleration of the stylus in a direction away from the first electronic apparatus.

2. The electronic system of claim 1, wherein the first electronic apparatus further comprises:
   a second storage unit, configured for storing the first data; and
   a touch display panel, configured for displaying a first display image;
   wherein the second processing unit is coupled with the second wireless module, the touch display panel and the second storage unit, the second processing unit.

3. The electronic system of claim 2, wherein the stylus further comprises a second sensor coupled with the first processing unit, the second sensor generates a signal when the second sensor senses a touch on the stylus, and the first processing unit detects the displacement of the stylus by the first sensor when the first processing unit receives the signal.

4. The electronic system of claim 2, further comprising a third wireless module coupled with the first processing unit, the third wireless module being configured to wirelessly transmit the first movement data.

5. The electronic system of claim 2, wherein the first storage unit is configured for storing second data, when the second processing unit determines that the displacement of the stylus matches a second setting range according to the first movement data, the first processing unit transmits the second data through the first wireless module, the second processing unit receives the second data through the second wireless module and stores the second data in the second storage unit.

6. The electronic system of claim 2, wherein the first storage unit is configured for storing second data, when the first processing unit determines that the moving pattern of the stylus matches a second setting range according to the first movement data, the first processing unit transmits the second data through the first wireless module, the second processing unit receives the second data through the second wireless module and stores the second data in the second storage unit.

7. The electronic system of claim 2, wherein the first display image comprises information from at least part of the first data, when the stylus manipulates the touch display panel to display the information from the first data, the first sensor generates the first movement data according to the displacement of the stylus.

8. The electronic system of claim 2, wherein the second storage unit is configured to store first identification data, the first processing unit transmits second identification data through the first wireless module to the first electronic apparatus, when the second processing unit determines that the second identification data matches the first identification data, the first electronic apparatus transmits the first data to the stylus.

9. The electronic system of claim 1, wherein the first electronic apparatus further comprises a third sensor, the third sensor generates second movement data according to displacement of the first electronic apparatus, the first electronic apparatus transmits or receives the first data according to the first movement data and the second movement data.

10. A stylus, configured for manipulating an electronic, apparatus, the stylus comprising:
    a first processing unit;
    a storage unit, coupled with the first processing unit, the storage unit being configured for storing data;
    a first sensor, coupled with the first processing unit, the first sensor generating movement data according to displacement of the stylus; and
    a first wireless module, coupled with the first processing unit, the first wireless module being configured for transmitting the data,
    wherein, when the first processing unit determines that the movement data matches a first setting range, the first wireless module transmits the data to the electronic apparatus;

wherein the first setting range corresponds to a predefined acceleration of the stylus in a direction away from the first electronic apparatus.

11. The stylus of claim 10, further comprising a second sensor coupled with the first processing unit, wherein when the second sensor senses a touch on the stylus, the first processing unit detects displacement of the stylus by the first sensor.

12. A method, utilized between a first electronic apparatus and a stylus, the method comprising:
generating first movement data according to displacement of the stylus;
determining a moving pattern of the stylus according to the first movement data; and
transmitting first data from the first electronic apparatus to the stylus when the first movement data matches a first setting range;
wherein the first setting range corresponds to a predefined acceleration of the stylus in a direction away from the first electronic apparatus.

13. The method of claim 12, further comprising:
determining whether the moving pattern matches a second setting range according to the first movement data; and
transmitting second data from the stylus to the first electronic apparatus when the first movement data matches the second setting range.

14. The method of claim 12, further comprising:
sensing a touch on the stylus; and
generating the first movement data according to the displacement of the stylus when the touch is sensed.

15. A method, utilized between a first electronic apparatus with a touch display panel and a stylus, the method comprising:
generating first movement data according to displacement of the stylus;
generating second movement data according to displacement of the first electronic apparatus;
determining a moving pattern of the stylus according to the first movement data and the second movement data; and
transmitting first data from the first electronic apparatus to the stylus when the moving pattern of the stylus matches a first setting range.

16. The method of claim 15, further comprising:
determining whether the moving pattern matches a second setting range according to the first movement data and the second movement data; and
transmitting second data from the stylus to the first electronic apparatus when the first movement data matches the second setting range.

17. The method of claim 15, further comprising:
sensing a touch on the stylus; and
generating the first movement data according to the displacement of the stylus when the touch is sensed.

18. The method of claim 15, further comprising:
displaying information from at least part of the first data on the touch display panel; and
when the stylus manipulates the touch display panel to display the information from the first data, generating the first movement data by the stylus according to the displacement of the stylus.

19. The method of claim 15, further comprising:
storing first identification data within the first electronic apparatus;
transmitting second identification data by the stylus to the first electronic apparatus; and
activating a data transmission between the first electronic apparatus and the stylus when the second identification data is determined to match the first identification data.

* * * * *